United States Patent [19]

Kim et al.

[11] Patent Number: 5,453,894
[45] Date of Patent: Sep. 26, 1995

[54] AUTOMATIC HEAD CLEANING APPARATUS FOR MAGNETIC RECORDING/PLAYBACK SYSTEM

[75] Inventors: Su K. Kim, Seoul; Joong K. Joh, Kyungki, both of Rep. of Korea

[73] Assignee: Goldstar Co., Ltd., Seoul, Rep. of Korea

[21] Appl. No.: 306,519

[22] Filed: Sep. 15, 1994

Related U.S. Application Data

[63] Continuation of Ser. No. 924,505, Aug. 4, 1992.

[30] Foreign Application Priority Data

Aug. 5, 1991 [KR] Rep. of Korea ............... 12466/1991
Nov. 19, 1991 [KR] Rep. of Korea ............... 20620/1991

[51] Int. Cl.$^6$ ................................................ G11B 5/41
[52] U.S. Cl. ................................................ 360/128
[58] Field of Search ....................... 360/128, 137, 360/130.21–130.33; 15/DIG. 12–14

[56] References Cited

U.S. PATENT DOCUMENTS

| | | | |
|---|---|---|---|
| 4,704,647 | 11/1987 | Hino | 360/128 |
| 5,182,691 | 1/1993 | Mimasu et al. | 360/128 |

FOREIGN PATENT DOCUMENTS

| | | | |
|---|---|---|---|
| 0286110 | 11/1989 | Japan | 360/128 |
| 0187913 | 7/1990 | Japan | 360/128 |
| 0201724 | 8/1990 | Japan | 360/128 |
| 0134813 | 6/1991 | Japan | 360/128 |

*Primary Examiner*—Robert S. Tupper
*Assistant Examiner*—Brian E. Miller

[57] ABSTRACT

An automatic head cleaning apparatus for a magnetic recording/playback system which has a cleaning roller the vertical position of which is varied so that an area of cleaning member in contact with a head is widened, thereby allowing the useful life of the apparatus to be lengthened. The apparatus comprises an arm pivotably mounted on a pin fixed to base plate which arm is pivoted by being in contact with a moving slant post assembly for causing a tape to be loaded and unloaded on a head drum; an elastic member for biasing the arm in one direction; an operating lever, pivotably mounted on the pin, which is cooperatively connected with the arm; a first member for changing the vertical position of the operating lever in response to a pivoting movement of the operating lever; and a second member for cleaning the head, said second member rotatably mounted on an end of the operating lever which is itself pivoted and moved vertically at the same time, wherein the second member is in contact with the head drum and the head during a tape loading or unloading operation.

5 Claims, 7 Drawing Sheets

AUTOMATIC HEAD CLEANING APPARATUS FOR MAGNETIC RECORDING/PLAYBACK SYSTEM

This application is a continuation of application Ser. No. 07/924,505 filed on Aug. 4, 1992, now abandoned.

BACKGROUND OF THE INVENTION

1. Field of the Invention

The present invention relates to a head cleaning apparatus for systems such as a video cassette tape recorder (hereinbelow, referred to as "VCR") and a digital audio cassette recorder (hereinbelow, referred to as "DAT") using magnetic recording/playback tapes, and more particularly to an automatic head cleaning apparatus for a magnetic recording/playback system which has a cleaning roller variable in height so that an area of cleaning member being in contact with a head of the system is more widened, thereby allowing its useful life to be lengthened.

2. Description of the Prior Art

A magnetic recording/playback system, such as a video cassette tape recorder (VCR) and a digital audio cassette recorder (DAT) using magnetic recording/playback tapes, generally involves a problem that a head is likely to be contaminated because the head mounted on a head drum comes into contact with magnetic recording/playback tapes to read out information recorded on the tapes.

Since such a contamination of a head may cause a picture quality and a sound quality to be deteriorated seriously during playback operations, the head must be subjected to cleaning treatments periodically.

As such a cleaning treatment of a head, there has been proposed a method in which a head is cleaned by using a separate cleaning cassette. However, since the method necessitates a separate cleaning cassette additionally, the cleaning treatment is substantially cumbersome. Accordingly, there has recently been utilized an automatic head cleaning apparatus which is established in a player having the head to clean the head automatically.

With reference to FIGS. 1 and 2, there are illustrated a prior automatic head cleaning apparatus for a magnetic recording/playback system.

In FIG. 1, the known magnetic recording/playback system is constructed as will be described hereinafter. A head drum 20 is mounted on a base plate 10 of the magnetic recording/playback system. The head drum 20 comprises an upper rotating head drum 21 and a lower stationary drum 22. A head 23 is provided between the upper rotating head drum 21 and the lower stationary head drum 22. The head drum 20 is inclinedly mounted on the base plate 10 at a given angle with respect to the base plate. Two guide slots 40 are oppositely formed at the base plate 10 around and spaced away from the head drum 20, respectively. A slant post assembly 30 consisting of a base 31 and a slant post 32 and guide roller 33 attached to the base 31 is slidably mounted in each of the guide slots 40 (only one side of the head drum is shown in the drawing).

In the above-described magnetic recording/playback system, the known head cleaning apparatus is constructed as will be described hereinafter. An arm 50 is pivotably mounted at an end thereof on a pin 70 fixed to the base plate 10. As the slant post assembly 30 is moved rearwardly and forwardly, the arm 50 comes into contact with the slant post assembly 30 at a middle portion thereof, thereby allowing the arm 50 to be pivoted.

An operating lever 60 is pivotably mounted on the pin 70 at an end thereof and cooperatively connected with the arm 50. A cleaning roller 80 is rotatably mounted at the other free end of the operating lever 60. The cleaning roller 80 comes into contact with the head 23 of the drum 20 so as to clean the head 23 during a tape loading or unloading operation.

A torsion spring 71 is supported by the arm 50 at an end thereof and by the base plate 10 at the other end thereof so that the arm 50 is always caused to be biased in a clockwise direction.

Also, a spring 72 is connected with a spring hook 63 formed at the operating lever 60 at an end thereof and a spring hook 51 formed on the arm 50 at the other end thereof. Accordingly, as the arm 50 is moved in a counterclockwise direction, the operating lever 60 is pulled in the same direction by a tensile force of the spring 72 to be pivoted.

A stopper 73 is disposed between the operating lever 60 and the arm 50 and fixed to either of them. Therefore, the stopper 73 transmits a clockwise directional force of the arm 50 to the operating lever 60, thereby causing the operating lever 60 to be pivoted in a clockwise direction.

As illustrated in FIG. 2, the operating lever 60 is formed with a. Din supporting part 61 at the other end thereof. A cleaner supporting Din 90 is fixed to the pin supporting part 61. A cleaning roller 80 is rotatably mounted on the cleaner supporting Din 90. The cleaning roller 80 comprises a rotating roller 82 and a cleaning member 81 disposed on the circumferential surface of the rotating roller 82. Also, a washer 91 is inserted on and engaged with the cleaner supporting Din 90 in order to prevent the cleaning roller 80 from being separated from the cleaner supporting pin 90.

An operation of the above known head cleaning apparatus for a magnetic recording/playback system will be described as follows.

First, in case of a tape loading operation or unloading operation, as the slant post assembly 30 is rearwardly or forwardly moved along the guide slot 40 (herein the term "rearwardly" refers to the upward direction in FIG. 1), the base 31 of the slant post assembly 30 comes into contact with a middle portion of the arm 50 and pushes the arm 50 against the torsion spring 71 so that the arm is pivoted in a counterclockwise direction. Thus, as the arm 50 is pivoted in a counterclockwise direction, the operating lever 60 which is cooperatively connected with the arm 50 is also pivoted in a counterclockwise direction.

The arm 50 and the operating lever 60 are pulled to each other by the spring 72 and spaced apart from each other by the stopper 73 disposed therebetween, as mentioned above. Consequently, when the arm 50 is pivoted in a counterclockwise direction, the operating lever 60 is pulled to the arm 50 by means of the spring 72 and thus pivoted in a counterclockwise direction. On the other hand, when the arm 50 is pivoted in a clockwise direction, the operating lever 60 is pushed via the stopper 73 and thus pivoted in a clockwise direction.

Accordingly, when the arm 50 is pivoted in a counterclockwise direction, the operating lever 60 is also pivoted by the spring 72 in the same direction so that the cleaning roller 80 mounted on the free end of the operating lever 60 comes into contact with the head 23 of the head drum 20. At this time, since the upper head drum 21 of the head drum 23 is rotating continuously, the cleaning roller 80 is in contact with the rotating head 23 while being rotated, thereby carrying out cleaning action of the head 23.

Thereafter, when the slant post assembly 30 is moved to a tape loading completing position or a tape unloading position so that the slant post assembly 30 is disengaged from the arm 50, the arm 50 is pivoted in a clockwise direction by the torsion spring 71. Thus, the operating lever 60 is also pivoted in a clockwise direction by being cooperatively connected with the arm 50. Therefore, the cleaning roller 80 is moved to a position remote from the head 23 so that the apparatus completes the head cleaning action.

However, the above known head cleaning apparatus has disadvantages as will be described hereinafter. Since the cleaning member 81 of the cleaning roller 80 is rotated at a high speed in the condition of being pressed with the head 23 so as to clean the head 23, a contacting area of the cleaning member 81 of the cleaning roller 80 which is in contact with the head 23 is always fixed. Therefore, after the head cleaning apparatus is used for a long time, the contacting portion of the head 23 may be scratched and damaged by the cleaning member 81.

In addition, since the cleaning member 81 is locally and seriously contaminated along its narrow area corresponding to the head width after being used for a long time, the cleaning member 81 can not clean the head 23 any longer and on the contrary may contaminate the head 23. Furthermore, the cleaning roller 80 must be replaced with a new one because the cleaning member 81 is substantially shortened in its useful life. Hence, the head cleaning apparatus is not economical.

SUMMARY OF THE INVENTION

Accordingly, it is an object of the invention to provide an automatic head cleaning apparatus for a magnetic recording/playback system in which a cleaning roller can be moved upwardly and downwardly while being rotated during a tape loading or unloading operation in order to widen the area of a cleaning member in contact with a head, thereby lengthening its using life.

In accordance with the present invention, the object mentioned above can be accomplished by providing a head cleaning apparatus for a magnetic recording/playback system comprising: an arm pivotably mounted on a rotating pin fixed to a base plate which is pivoted by being in contact with a moving slant post assembly for causing a tape to be loaded and unloaded on a head drum; an elastic member for biasing the arm in one direction; an operating lever pivotably mounted on the rotating pin which is cooperatively connected with the arm; a member for changing the operating lever height in response to a pivoting movement of the operating lever; and a member, for cleaning the head rotatably mounted on an end of the operating lever which is raised and lowered while being rotated by being in contact with the head drum and the head during a tape loading or unloading operation.

The lever level changing member comprises: a supporting cylinder fixed to the base plate which has an endless slant groove at an inner surface thereof; a rotating column, rotatably mounted in the supporting cylinder, which is rotated along the slant groove in response to the rotation of the operating lever, thereby causing the operating lever to be raised and lowered; and a compression spring fixed to the free end of the rotating pin which biases the operating lever downwardly.

The cleaning member comprises: a pin supporting part formed at an end of the operating lever; a cleaner pin fixed to an upper end of the pin supporting part; a base formed at the upper end of the pin supporting part; a cylinder cam formed at an upper surface of the base, the cylinder cam having a cam surface varying in height at the upper end thereof; a cleaning roller, rotatably mounted on the cleaning pin, which comprises a column having an upper and a lower flanges, a central hole through which the axis of the column passes, and a cleaning member interposed between the upper and lower flanges; a cam follower formed at a lower surface of the lower flange which comes into contact with and slides on the cam surface of the cylinder cam; a compression spring inserted on the cleaner pin and disposed on the upper flange; and a washer fixed to a free end of the cleaner pin against the compression spring, thereby causing the cleaner roller to be biased downwardly by the compression spring.

According to the present invention constructed as mentioned above, the slant post assembly is moved and comes into contact with the arm so that the arm is pivoted in a counterclockwise direction. As the arm is pivoted, the operating lever which is cooperatively connected with the arm is also pivoted so that the cleaner mounted at the end of the arm comes into contact with the head drum, thereby carrying out cleaning action of the head. At this time, the lever height changing device causes the operating lever to be raised and lowered in response to pivoting movement of the operating lever so that the cleaner is also raised and lowered while being rotated in a state of being in contact with the head drum. Accordingly, the area of the cleaner in contact with the head is substantially widened, thereby allowing the head cleaning action to be carried out effectively and the useful life of the cleaner to be lengthened.

BRIEF DESCRIPTION OF THE DRAWINGS

These and other objects, features and advantages of the invention will become more apparent upon a reading of the following detailed specification and drawings, in which.

DESCRIPTION OF THE PREFERRED EMBODIMENTS

Figure 1:
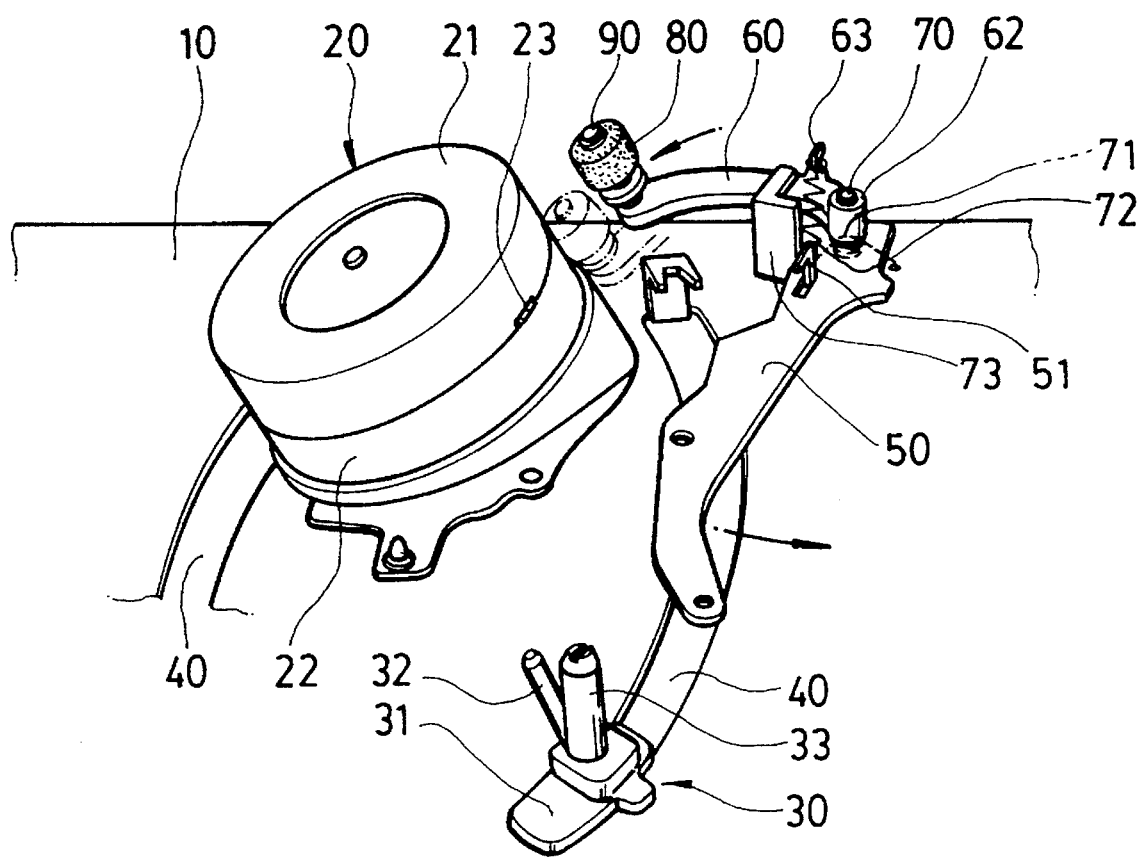
FIG. 1 is a perspective view showing a known head cleaning apparatus for a magnetic recording/playback system.
Figure 2:
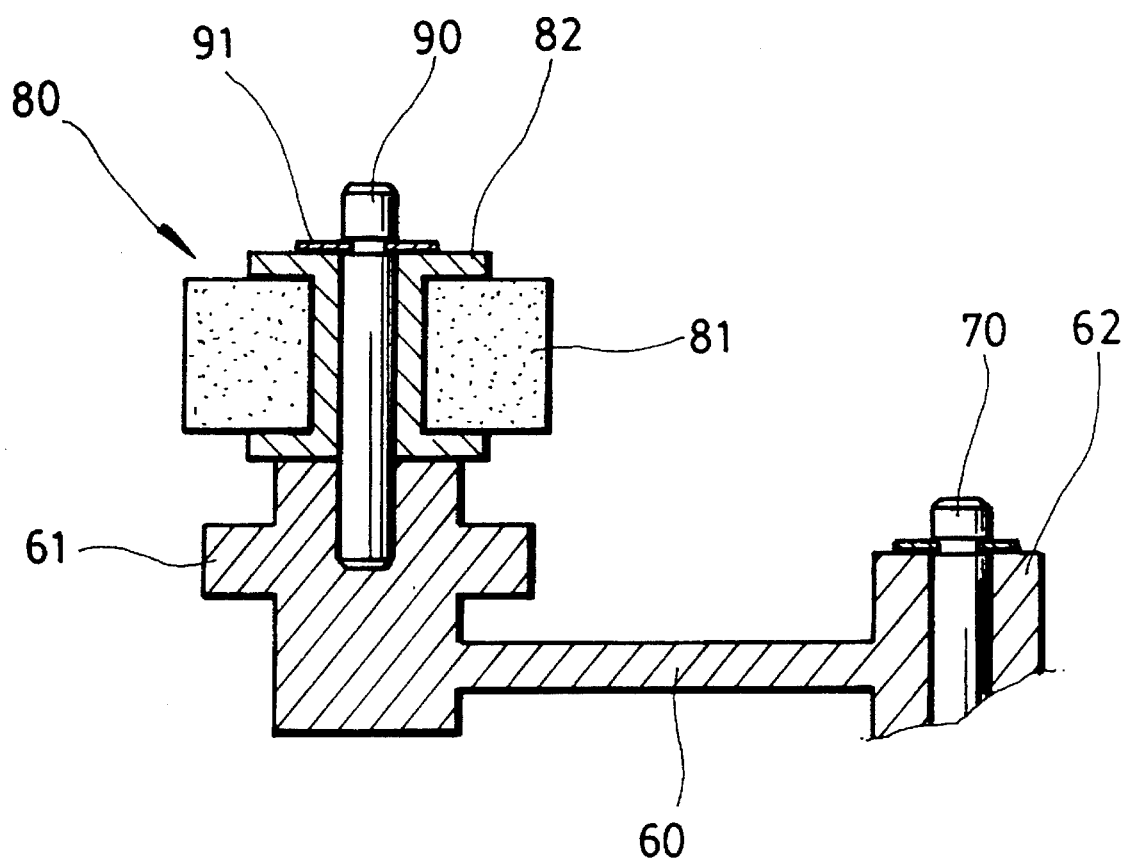
FIG. 2 is an enlarged sectional view showing a cleaning roller of the apparatus shown in FIG. 1.

An automatic head cleaning apparatus for a magnetic recording/playback system according to the present invention will now be described by referring to FIGS. 3 to 8B in the accompanying drawings.

Referring now to FIGS. 3 to 6, there are shown the automatic head cleaning apparatus for a magnetic recording/ playback system according to the present invention. The automatic cleaning apparatus according to the invention is constructed as follows. A head drum 110 is mounted inclined on the base plate 100 at a given angle with respect to the base plate 100. The head drum 110 comprises an upper rotating head drum 111 and a lower stationary drum 112. A head 113 is provided between the upper rotating head drum 111 and the lower stationary head drum 112. Two guide slots 130 are oppositely formed at the base plate 100 around and spaced away from the head drum 110, respectively. A slant post assembly 120 consisting of a base 121 and a slant post 122 and guide roller 123 attached to the base 121 are slidably mounted in each of the guide slots 130 (only one side of the head drum is shown in the drawings).

In the above-described magnetic recording/playback system, the automatic head cleaning apparatus according to the invention is constructed as will be described hereinafter. An arm 140 is pivotably mounted at an end thereof on a rotating pin 170 fixed to the base plate 100. As the slant post assembly 120 is moved rearwardly or forwardly, the slant post assembly 120 comes into contact with and pushes the arm 140 so that the arm 140 is pivoted. An operating lever 160 is pivotably mounted on an end thereof on the rotating pin 170 and cooperatively connected with the arm 140.

The operating lever 160 is provided with a cleaning means at the other free end thereof. The cleaning means is rotatably mounted on the operating lever 160. While the cleaning means is rotated by being in contact with the head 113, the cleaning means is moved upwardly and downwardly by movement of the arm 140, thereby causing the head 113 of the head drum 110 to be cleaned effectively.

A torsion spring is disposed under the arm 140 and fixed to the arm 140 at an end thereof and to the base plate 100 at the other end thereof. A lever height changing device 150 (FIG. 4) is inserted on the pin 170 between the operating lever 160 and the arm 140 so as to force the operating lever 160 to be moved upwardly and downwardly by pivoting movement of the operating 1 ever 160.

The arm 140 is formed with a hole 142 at an end thereof so as to be inserted on the pin 170 through the hole 142. Also, the arm 140 is provided with a contacting surface 141 at the middle portion thereof. Accordingly, as the slant post assembly 120 is moved rearwardly or forwardly, the base 121 of the slant post assembly 120 comes into contact with the contacting surface 141 of the arm 140, thereby causing the arm 140 to be pivoted. The arm 140 has a lever connecting part 143 at a side of rear portion thereof and a spring fixing protrusion 144 at the rear end thereof. The lever connecting part 143 is connected with the operating lever 160 and the spring fixing protrusion 144 is engaged with the torsion spring 180.

The torsion spring 180 is inserted on the pin 170 at a coil part thereof and disposed under the arm 140. Also, the torsion spring 180 is engaged at one end with a protrusion (not shown) formed at the base plate 100 and, at the other end, with a spring fixing protrusion 144 formed at the rear end of the arm 140 so that the arm 140 is elastically biased in a counterclockwise direction.

The lever height changing device 150 comprises a supporting cylinder 151 fixed to the base plate 100 which has a slant endless groove 154 at the inner surface thereof, a rotating column 157 inserted in the supporting cylinder 151 which travels along the slant groove 154 to cause the operating 1 ever 160 to be moved upwardly and downwardly, and a compression spring 190 (for biasing the operating lever 160 downwardly) which is mounted on the free end of the rotating pin 170.

The supporting cylinder 151 is formed with the slant endless groove 154 at the inner surface thereof and provided with a plurality of supporting legs 152 at the lower end thereof. Each of the supporting legs 152 has a coupling hole 153 and the base plate 100 is formed with a plurality of coupling holes 101 corresponding to the holes 153 so that the supporting cylinder 151 can be fixed to the base plate 100 by means of screws 156 through the holes 101 and 153. The supporting cylinder 151 is formed at the upper end thereof with a cut 155 leading to the slant groove 154 so as to receive the rotating column 157 through the cut 155.

The rotating column 157 has a hole 157a at its center so as to be rotatably mounted on the pin 170. The rotating column 157 is provided with a plurality of radial serrated projections 158 at the top surface thereof and a guide 159 at the lower circumferential surface thereof. Each of the serrated projections 158 has an inclined side surface and a vertical side surface. Accordingly, the rotating column 157 is inserted in the supporting cylinder 151 in such a manner that the guide 159 of the rotating column 157 is guided to the slant groove 154 through the cut 155 and then disposed in the slant groove 154.

The operating lever 160 is bent downwardly and outwardly at both ends thereof to form step portions. An end of the operating lever 160 is extended outwardly and a cleaning means is rotatably mounted on the extended end. The other end of the operating lever 160 is formed with an arm connecting part 163 adapted to be connected with the lever connecting part 143 of the arm 140. Also, the operating lever 160 has a central hole 162 so as to be pivotably mounted on the pin 170. The operating lever 160 is provided at the lower surface of a middle portion thereof with a radial projection 161 adapted to be engaged with the radial serrated projections 158 formed at the top surface of the rotating column 157.

The pin 170 is fixed to the base plate 100. Inserted on the pin 170 are the torsion spring 180, the arm 140, the supporting cylinder 151, the rotating column 157, the operating lever 160 and the compression spring 190 in this other. Finally, a washer 200 is coupled to one end of the pin 170 so as to prevent the above-mentioned components inserted on the pin 170 from being separated therefrom.

Figure 3:
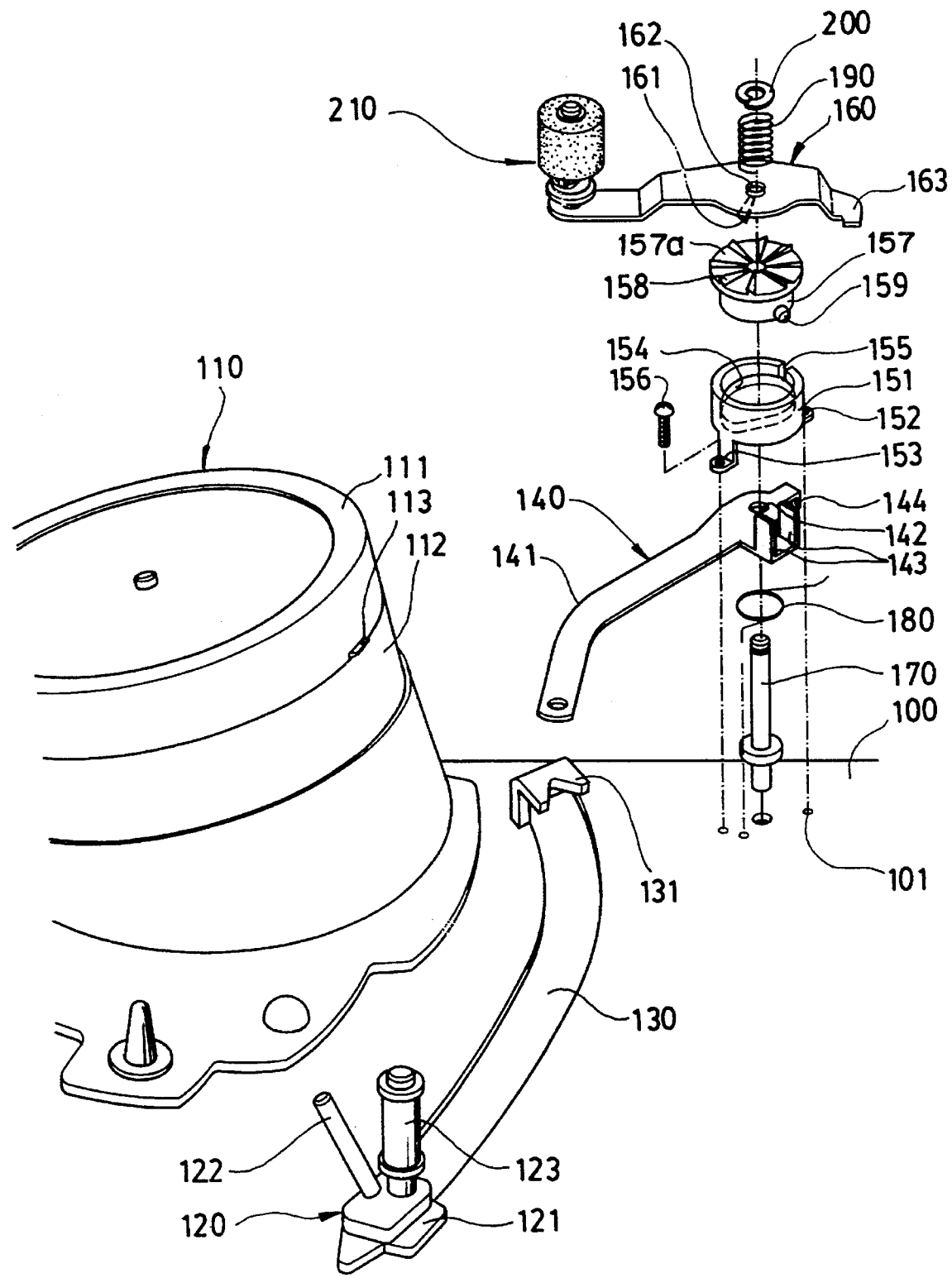
FIG. 3 is an exploded perspective view showing a lever level changing device of an automatic head cleaning apparatus for a magnetic recording/playback system according to the present invention.
Figure 4:
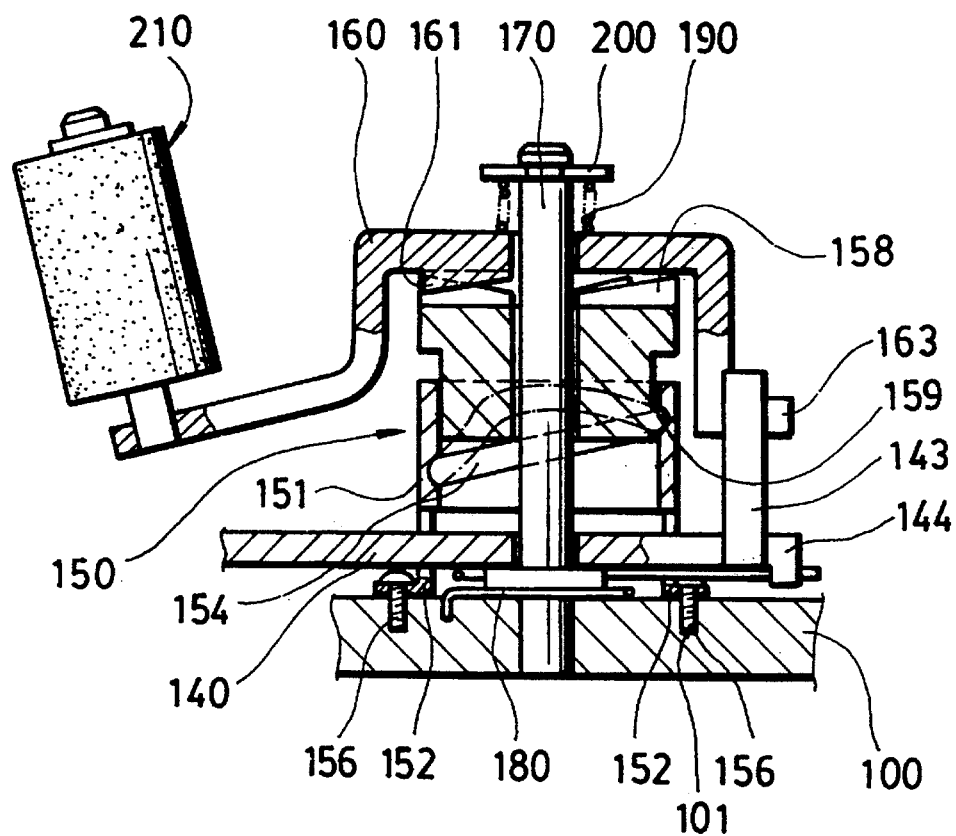
FIG. 4 is a cross sectional view showing the automatic head cleaning apparatus for magnetic recording/playback system according to the invention, in which the lever level changing device and an arm are assembled.
Figure 5:
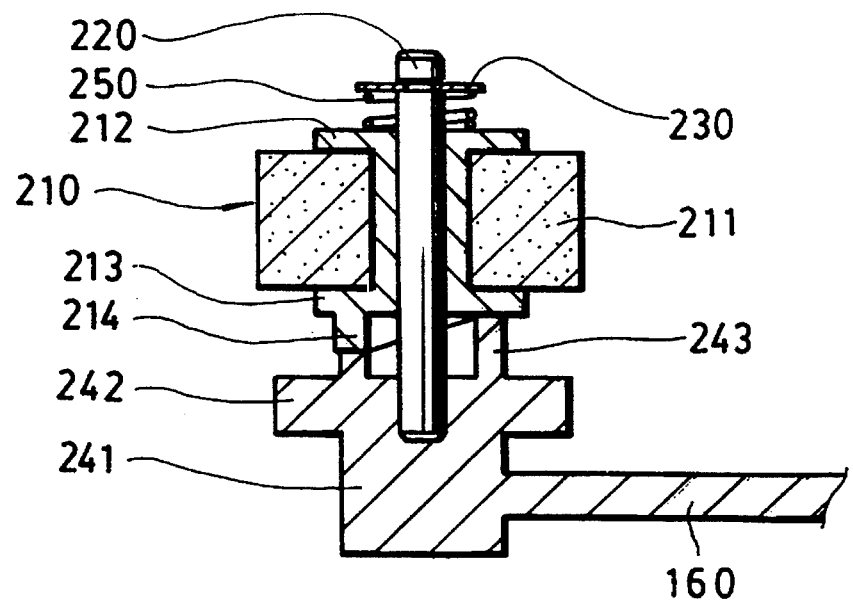
FIG. 5 is a cross sectional view showing a cleaning means of the automatic head cleaning apparatus for magnetic recording/playback system according to the invention.
Figure 6:
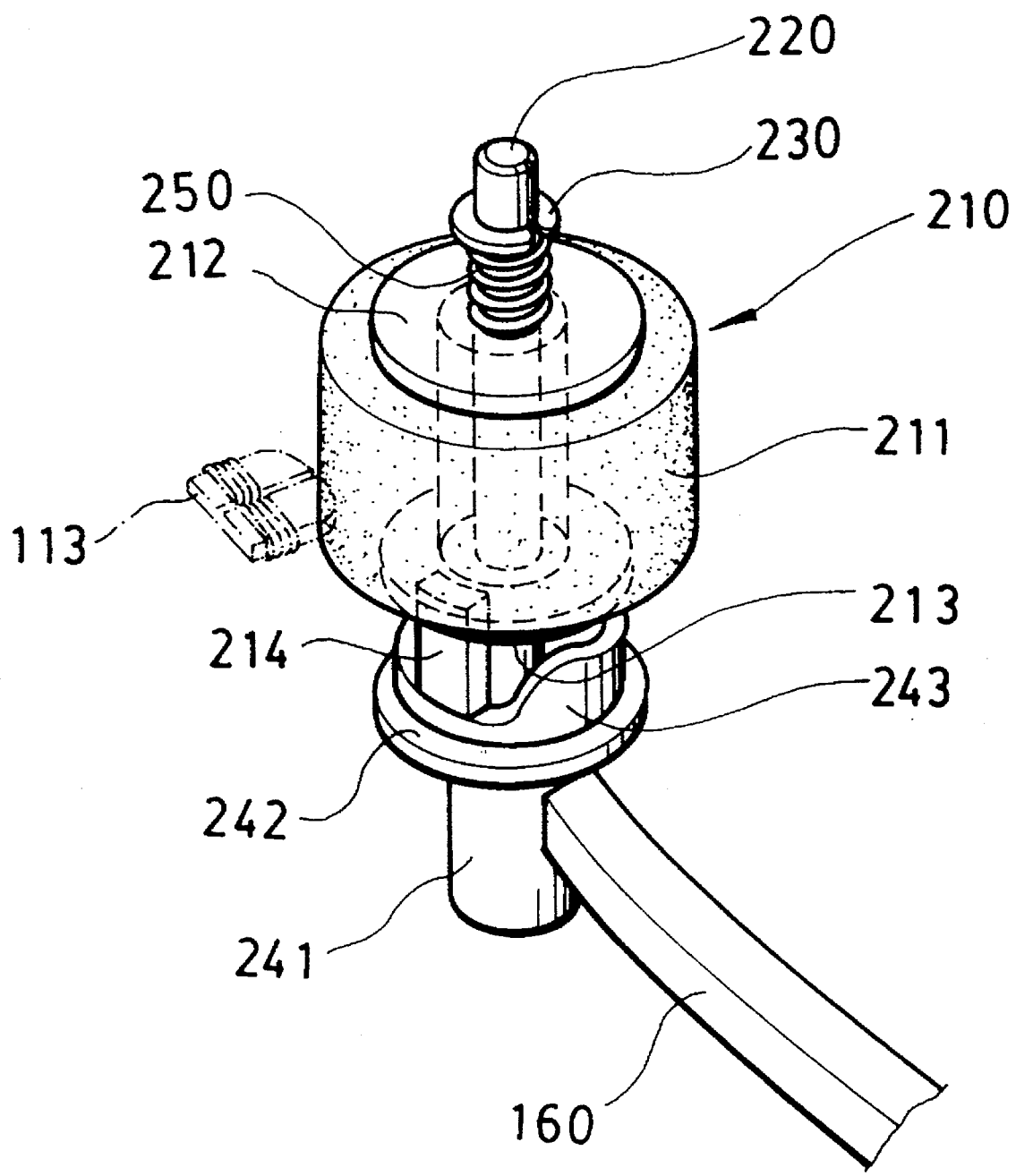
FIG. 6 is a perspective view showing the cleaning means shown in FIG. 5.

The cleaning means is constructed as described hereinafter. The operating lever 160 has a pin supporting part 241 at an extended end thereof. A cleaner pin 220 is fixed to an upper end of the pin supporting part 241. The pin supporting part 241 is provided with a flange-shaped base 242 at an upper end thereof. The base 242 is provided with a cylinder cam 243 at an upper surface thereof. The cylinder cam 243 has a cam surface varying in height at the upper end thereof. A cleaning roller 210 comprises a column having an upper and lower flanges 212 and 213 and a central hole through the column axis, and a cleaning member 211 interposed between the upper and lower flanges 212 and 213. The cleaning roller 210 is rotatably mounted on the cleaning pin 220 through the central pin hole thereof. A cam follower 213 is formed at the lower surface of the lower flange 213. The cam follower slides on the cam surface of the cylinder cam 243. Therefore, upon being rotated about the cleaner pin 220, the cleaning roller 210 is moved upwardly and downwardly. A compression spring 250 is inserted on the cleaner pin 220 and disposed on the upper flange 212. A washer 230 is fixed to the free end of the cleaner pin 220 against the compression spring 250 so that the cleaner roller 210 is biased downwardly by the compression spring 250. In FIG. 3, the reference numeral 131 is a stopper formed at the rear end of the guide slot 130.

Operation of the head cleaning apparatus for a magnetic recording/playback system according to the present invention will be described as follows.

Figure 7A:
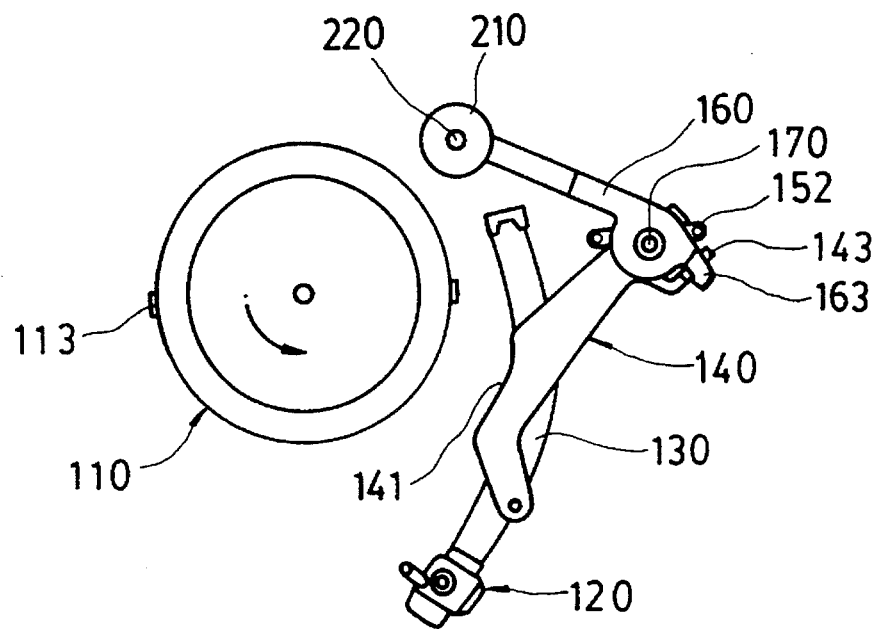
FIG. 7A is a top plan view illustrating a head cleaning operation of the automatic head cleaning apparatus for magnetic recording/playback system according to the invention in a tape loading mode when the cleaning operation is not initiated yet.
Figure 7B:
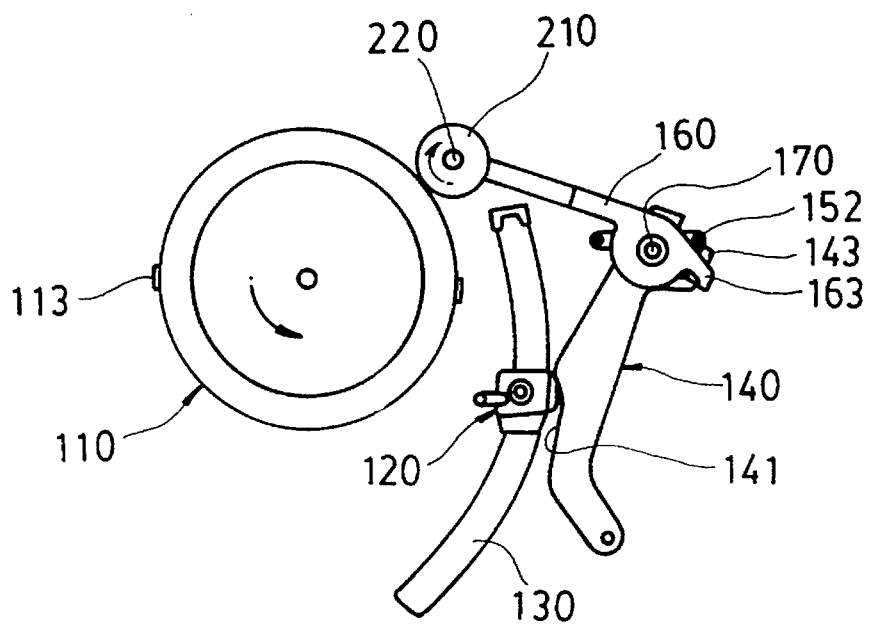
FIG. 7B is a similar view to FIG. 7A when the cleaning operation is being carryied out.
Figure 7C:
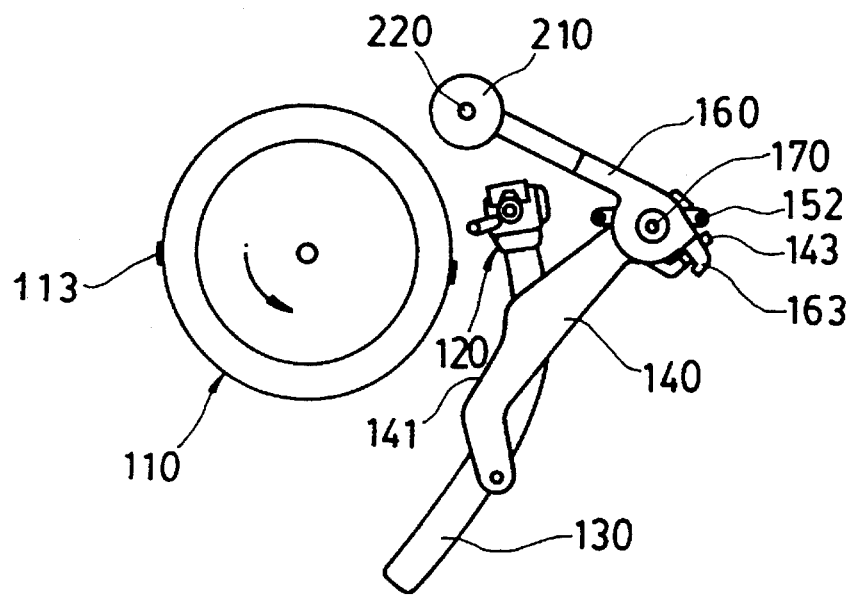
FIG. 7C is a similar view to FIG. 7A when the cleaning operation is completed.

Referring to FIGS. 7A to 7C, there are shown the automatic head cleaning apparatus for a magnetic recording/playback system according to the invention in which a cleaning operation is not initiated yet, is being carryied out and is completed, respectively. First, when a tape loading operation of the magnetic recording/playback system has not been initiated yet, the cleaning roller 210 is located at a position remote from the head drum 110 so that the head cleaning action is not carried out, as illustrated in FIG. 7A.

Thereafter, upon beginning the tape loading operation, the slant post assembly 120 is moved rearwardly along the guide slot 130 to come into contact with the arm 140. While the slant post assembly 120 is in contact with the cleaning contacting surface 141 of the arm 140 and moved rearwardly, the cleaning roller 210 is in contact with the head drum 110 so that the head cleaning action is carried out, as illustrated in FIG. 7B.

Subsequently, when the slant post assembly 120 is further moved rearwardly along the guide slot 130 so that the base 121 of the slant post assembly 120 is disengaged from the contacting surface 141 of the arm 140, the cleaning roller 210 is moved to a position remote from the 110, thereby completing the cleaning operation, as illustrated in FIG. 7C.

In other words, while the head cleaning operation is carried out during the tape loading operation, the operation is stopped when the tape loading operation is completed.

On the other hand, as the tape unloading operation is carried out, the slant post assembly 120 is moved to the condition shown in FIG. 7B from the condition shown in FIG. 7C and then moved to the condition shown in FIG. 7A, thereby completing the tape unloading operation. Accordingly, the head cleaning operation is also carried out during the tape unloading operation.

The head cleaning operation carried out by the automatic head cleaning apparatus according to the invention during the tape loading and unloading operations will be more specifically described hereinafter.

Upon beginning the tape loading or unloading operation of the magnetic recording/playback system, the slant post assembly 120 is moved along the guide slot 130 so that the assembly 120 comes into contact with the arm 140. As the slant post assembly 120 is further moved, the base 121 of the slant post assembly 120 pushes the arm 140 against the torsion spring 180 so that the arm 140 is pivoted in a counterclockwise direction. Also, the counterclockwise directional pivoting movement of the arm 140 causes the operating lever 160 connected with the arm 140 to be pivoted in a counterclockwise direction. Then, while the base 121 of the slant post assembly 120 is in contact with the contacting surface 141 of the arm 140, the cleaning member 211 of the cleaning roller 210 is in contact with the head drum 110 of the head 113 and rotated, thereby carrying out the head cleaning action.

At this time, when the operating lever 160 is pivoted, the operating lever 160 causes the rotating column 157 of the lever height changing device 150 to be rotated in such a manner that one of the radial serrated projections 158 formed at the top surface of the rotating column 157 is engaged with and rotated by the radial projection 161 formed at the lower surface of the operating lever 160.

In other words, since the serrated projections 158 each has the vertical surface facing in a clockwise direction and the inclined surface facing in a counterclockwise direction, and on the contrary the projection 161 has the inclined surface facing in a clockwise direction and the vertical surface facing in a counterclockwise direction, the operating lever 160 causes the rotating column 157 to be rotated by engagement of the vertical surface of the projection 158 with the vertical surface of the projection 161 when being pivoted in a counterclockwise direction but the operation lever 160 is slid over one of the serrated projections 158 of the rotating column 157 by engagement of the inclined surface of the projection 158 with the inclined surface of the projection 161 and then engaged with a subsequent one of the projections 158 when being pivoted in a clockwise direction. Therefore, the operating lever 160 can transmit only its counterclockwise directional rotating force to the rotating column 157 but the operating lever 160 can not transmit its clockwise directional rotating force to the rotating column 157.

During one head cleaning operation (that is, one tape loading operation or one tape unloading operation), the operating lever 160 rotates the rotating column 157 at the angular interval corresponding to an angle between the serrated projections 158 of the rotating column 157.

As the rotating column 157 is rotated, the guide 159 of the rotating column 157 travels along the slant groove 154 formed at the inner surface of the supporting cylinder 151 so that the rotating column 157 is raised and lowered. Accordingly, the rotating column 151 and thus the operating lever 160 are rotated and moved upwardly and downwardly. At every tape loading or unloading operation, the rotating column 157 and the operating lever 160 are changed in height. Thus, a head contacting area of the cleaning member 211 of the head cleaning roller 210 which is in contact with the head 113 is also changed in height.

In addition, since the head drum 110 having the head 113 is rotating at a high speed and the cleaning member 211 mounted on the cleaning roller 210 is in contact with the head drum 110 and the head 113, the cleaning roller 210 is also rotated at a predetermined speed ratio.

As the cleaning roller 210 is rotated, the cam follower 214 formed at the lower surface of the lower flange 213 slides on the cam surface of the cylinder cam 243. Since the cam surface of the cylinder cam 243 has different heights therealong, the cleaning roller 210 is rotated and moved vertically at the same time. Accordingly, the cleaning member 211 mounted on the circumferential surface of the cleaning roller 210 is also rotated and moved upwardly and downwardly within a predetermined vertical distance while being in contact with the head 113, thereby cleaning the head.

Thereafter, upon being further moved to the completed position of tape loading operation or tape unloading operation, the slant post assembly 120 is disengaged from the arm 140. Consequently, the arm 140 is pivoted by the torsion spring 180 in a clockwise direction so that the operating lever 160 cooperatively connected with the arm 140 is pivoted in a clockwise direction. Then, the cleaning roller 210 is moved to the predetermined position remote from the head drum 110, thereby completing the head cleaning operation.

Figure 8A:
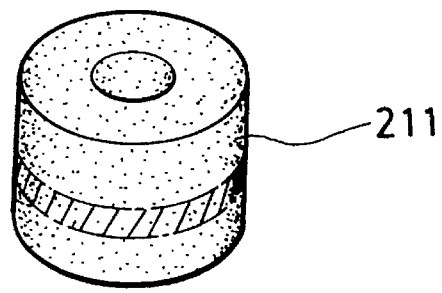
FIG. 8A is a perspective view showing a head contacting area of a cleaning member of the known head cleaning apparatus for a magnetic recording/playback system.
Figure 8B:
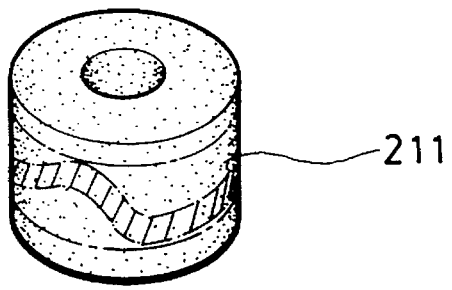
FIG. 8B is a perspective view showing a head contacting area of a cleaning member of the automatic head cleaning apparatus for a magnetic recording/playback system according to the invention.

Referring to FIGS. 8A and 8B, there are shown a known cleaning member and the cleaning member according to the invention which indicate a head contacting area. As apparent from the above description, the automatic head cleaning apparatus according to the invention carries out a head cleaning operation such that, while the head cleaning operation is being carried out at the time of every tape loading or unloading operation, the operating lever moves vertically and at the same time the cleaning roller is rotated and moves vertically. Accordingly, since the head contacting area of the cleaning member according to the invention shown in FIG. 8B is widened compared to that shown in FIG. 8A, it is possible to clean the head effectively as compared with the prior art and to diminish or prevent head contamination by being in contact with the cleaning member. Also, since the head is in contact with a wider area of the cleaning member, it is possible to prevent the cleaning member from being worn away locally. Furthermore, since the useful life of the cleaning member is substantially lengthened, it is possible to diminish the frequency that the cleaning roller must be replaced and thus to cause the head cleaning apparatus to be used economically.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An automatic head cleaning apparatus for a magnetic recording/playback system comprising:

an arm pivotably mounted on a pin which is fixed at one end to a base plate, said arm being pivoted by being in contact with a moving slant post assembly for causing a tape to be loaded and unloaded on a head drum including a head;

an elastic means for biasing the arm in one direction;

an operating lever, pivotably mounted on the pin, which is cooperatively connected with the arm;

first means for changing the vertical position of the operating lever in response to be a pivoting movement of the operating lever, said first means including:

a supporting cylinder, fixed to the base plate, which has an endless slant groove at an inner surface thereof;

a rotating column, rotatably mounted in the supporting cylinder, which is rotated along the slant groove in response to the rotation of the operating lever, thereby causing the operating lever to be raised and lowered; and a compression spring, fixed to the other end of the pin, which biases the operating lever downwardly;

second means, which cannot be moved vertically with respect to the operating lever, for cleaning the head, said second means being rotatably mounted on an end of the operating lever, said operating lever being rotated and moved vertically at the same time, said second means being in contact with the head drum and the head during a tape loading or unloading operation.

2. An apparatus according to claim 1, in which said rotating supporting cylinder comprises:

an endless slant groove formed at the inner surface of the supporting cylinder;

a plurality of supporting legs formed at a lower end of the supporting cylinder, each of the supporting legs having at one end a coupling hole adapted to fix the supporting leg to the base plate by a screw; and a cut formed at an upper end of the supporting cylinder which leads to the slant groove.

3. An apparatus according to claim 1, in which said rotating column comprises:

a hole formed at the rotating column for permitting the rotating column to be rotatably mounted on the pin;

a plurality of radial serrated projections, formed at a top surface of the rotating column, each of the radial serrated projections having a vertical surface and an inclined surface; and a guide, formed at a circumferential surface of the rotating column, which travels along the slant groove of the supporting cylinder, thereby causing the rotating column to be raised and lowered.

4. An apparatus according to claim 1, in which said operating lever comprises:

two bent portions formed at the opposite ends of the operating lever, each of the bent portions being bent downwardly and outwardly;

a central hole passed through the operating lever for permitting the operating lever to be pivotably mounted on the pin; and a radial projections formed at a lower surface of a middle portion of the operating lever, which is engaged with one of radial serrated projections of a rotating column to rotate the rotating column only in one direction, the radial projection corresponding to the radial serrated projections of the rotating column.

5. An automatic head cleaning apparatus for a magnetic recording/playback system comprising:

an arm mounted to a base plate and pivoted by being contacted by a moving slant post assembly;

an operating lever having a cylinder cam and cooperatively connected with said arm; and means for cleaning a recording head, said cleaning means being rotatably mounted on said operating lever, the cleaning means including:

a pin supporting part formed at one end of the operating lever;

a cleaner pin fixed to an upper end of the pin supporting part;

a base formed at the upper end of the pin supporting part;

a cylinder cam formed at an upper surface of the base, the cylinder cam having a cam surface varying in height at the upper end thereof;

a cleaning roller, rotatably mounted on the cleaner pin, the cleaning roller comprises a cylindrical column having an upper flange and a lower flange, a central hole through the axis of the cylindrical column and a cleaning member interposed between the upper and lower flanges;

a cam follower formed at a lower surface of the lower flange of the cylindrical column which comes into contact with and slides on said cam surface of the cylinder cam;

a compression spring inserted on the cleaner pin and disposed on the upper flange of the cylindrical column; and a washer fixed to an end of the cleaner pin against the compression spring, thereby causing the cleaner roller to be biased downwardly by the compression spring to thereby bias said cam follower against the cam surface so that said cleaning means moves vertically when the moving slant post assembly pivots said arm.

* * * * *